United States Patent Office 3,732,181
Patented May 8, 1973

3,732,181
POLYMER COMPOSITES REINFORCED WITH
LOW-MELT GLASS
Neil Hunter Ray, Hartford, and Francis Raymond Sherliker, Runcorn, England, assignors to Imperial Chemical Industries Limited, London, England
No Drawing. Filed Apr. 7, 1971, Ser. No. 132,180
Claims priority, application Great Britain, Apr. 17, 1970, 18,481/70
Int. Cl. C08g 51/04
U.S. Cl. 260—41 B                                    20 Claims

ABSTRACT OF THE DISCLOSURE

Composite materials of low melting inorganic oxide glass and organic polymers in which glass and polymer are co-deformable at suitable temperatures. The glasses have a transformation temperature in the range 100–400° C. Lead and zinc phosphate glasses are preferred. Methods of shaping composites and forming fibres in situ are described.

---

This invention relates to composite materials based on organic polymers and inorganic glasses, and to processes for their preparation.

The advantages of reinforcing an organic thermoplastic with an inorganic filler such as glass are well known. The stiffness of the composite is greater than that of the unfilled material. The introduction of the inorganic filler in the form of fibres improves certain other mechanical properties and higher fibre aspect ratios may improve these properties further. However, the commonly used reinforcing materials, e.g. silicate glasses, will not extend more than about 1–2% at the temperatures used for processing thermoplastic materials. While it is true that short lengths of glass fibres can be incorporated into thermoplastic materials and the composite subsequently processed by, for example, injection moulding, the proportion of fibre that can be used is limited to about 20% by volume because of the high viscosity of the mixture at the processing temperature. Greater proportions of fibres, or long fibre lengths can only be incorporated into organic polymers by applying a relatively fluid resin precursor and so thermosetting resins are more commonly used as the matrix material. The amount of deformation to which this composite can be subsequently subjected is very limited because severe distortion of the material causes either fracture of the reinforcement or disruption of the bond between matrix and reinforcement. Thus a composite of this type must be prepared in more or less the final shape required in the finished article.

One aspect of this invention allows the preparation of a composite containing glass reinforcement in a thermoplastic material which can be thermally deformed after incorporation of the reinforcing material, and in which a wide range of proportions of reinforcing material and matrix material may be used.

Another aspect of the invention provides a method of generating glass fibre reinforcement within a thermoplastic matrix without the need for spinning glass fibre before its introduction into the matrix material.

GENERAL PRINCIPLES OF THE INVENTION

Our invention provides a composite material containing an organic polymer and a glass having a transformation temperature in the range 100 to 400° C., preferably 120 to 300° C.

By "transformation temperature" of a glass we mean the temperature at which an increase in specific heat and thermal expansion coefficient occurs, which is accompanied by an abrupt reduction in viscosity. The transformation temperature may be determined by conventional techniques of thermal analysis, such as differential thermal analysis or differential scanning calorimetry. See for example Morey, G. W. "The Properties of Glass," Reinhold, N.Y. 1954 (2nd ed.) pp. 164–5.

Preferably the glass has an elastic modulus at 20° C. of at least $2 \times 10^6$ p.s.i.

Preferably the organic polymer is a thermoplastic. Preferably also, both the thermoplastic and the glass are selected so that the composite can be re-shaped without fracturing the glass at a temperature at which the organic polymer is deformable. Selected combinations of glass and polymer behaving in this way will be described as "thermally co-deformable." This temperature will usually lie between 120° C. and the limiting temperature for thermal stability of the thermoplastic. Clearly the exact temperature or range of temperatures will depend on the nature of the thermoplastic and the glass, and the process to which the materials are subjected. The process of deformation may require the viscosity of the materials to be comparable over a range of temperature which will vary with the process involved. The viscosity of both glass and thermoplastic is very dependent on temperature. Moreover, the viscosity of thermoplastic organic materials is very dependent on the rate of shear used in the process, while the viscosity of glasses is much less shear-dependent. While it is believed that the common knowledge of the polymer technologist and the glass technologist will readily permit selection of suitable combinations of thermoplastic and glass, and appropriate processing conditions, according to the process to be used and according to the type or shape of product required, the following guidelines and the examples at the end of this specification are given to aid understanding of the invention.

Conventional deformation processes e.g. extrusion, injection moulding, calendering or the spinning of fibre all require that the material be heated to a temperature at which the viscosity is sufficiently low for deformation or flow to occur at a practically useful rate and without the consumption of excessive power in the forming machine or the application of stresses high enough to cause mechanical degradation of the polymer. While a process such as injection moulding requires a sufficiently low viscosity to permit rapid filling of a mould, other processes, notably extrusion and calendering, operate with materials at higher viscosities to avoid excessive and unwanted flow in the shaped material (e.g. tube rod or sheet) as it is hauled off from the forming machine and cooled.

For an amorphous polymer forming operations are carried out above the glass/rubber transition temperature ($T_g$) but below the temperature at which decomposition (evidenced by discolouration, emission of volatile matter or poor physical properties in the formed product) becomes unacceptable. The optimum temperature being determined, as outlined above, by the type of forming process and also by the molecular structure, the average molecular weight and the molecular weight distribution of the polymer. It is also a common practice to add minor amounts of other materials to improve the flow behaviour during processing. Thus many commercial polymers are available in a range of grades each designed to meet particular processing requirements as well as to provide the necessary physical properties for specified end-uses.

In the case of crystalline or partially crystalline polymers the same general conditions apply but the processing temperature for most operations lies between the melting point ($T_m$), that is the temperature at which long range order is no longer detectable in the polymer and the decomposition temperatures as defined above. In practice it is found that as the temperature is increased above $T_m$ the viscosity falls rapidly and in many cases approximates to the value which might be expected from an amorphous polymer of the same chemical structure at the same temperature interval from its $T_g$.

For processing thermoplastic materials a guide to the optimum forming conditions is often provided by laboratory tests in which the viscosity/temperature characteristics are determined at shear rates which are comparable to those used in the forming machine. Various well known plastimeters and rheometers are used for this purpose which although providing valuable comparative data do not obviate the need for skilled operatives in setting up pilot or production scale forming machines. In the work described both approaches have been used. It will be appreciated that it is not possible to specify in general terms the requirements which glass and polymer must fulfill for all purposes. However, in Tables 1 and 2 below typical data are given for some common thermoplastics to allow selection of appropriate glasses for forming into composites.

TABLE 1.—AMORPHOUS THERMOPLASTICS

| Polymer | $T_g$, °C. | Approximate decomposition temperature, °C. | Processing temperature range, °C.[1] | Viscosity at 100 sec.$^{-1}$ | |
|---|---|---|---|---|---|
| | | | | Temperature, °C. | $10^4$ poise |
| Polystyrene (G.P.) | 100 | 320 | {I.M. 180–280... <br> {Ext. 150–200... | 200 <br> 180 | 0.8 <br> 1.15 |
| Polymethyl methacrylate | 105 | 300 | {I.M. 210–240... <br> {Ext. 160–180... | 240 <br> 200 | 0.62 <br> 4.5 |
| Polysulphone | 179 | 400 | Ext. 290–320... | 320 | 1.8 |
| Polyvinyl chloride | 87 | [2] 200 | {Ext. 160–180... <br> {....do.......... | 160 <br> 180 | 7.5 <br> 5.2 |

[1] I.M.=Injection moulding, Ext.=extrustion.
[2] Stabilizer.

TABLE 2.—PARTIALLY CRYSTALLINE THERMOPLASTICS

| Polymer | $T_g$, °C. | Approximate decomposition temperature, °C. | Processing temperature range, °C.[1] | Viscosity at 100 sec.$^{-1}$ | |
|---|---|---|---|---|---|
| | | | | Temperature, °C. | $10^4$ poise |
| Polyethylene (low density type-MF12) | 110–115 | 300 | {I.M. 260–280... <br> {Ext. 160–180... | 260 <br> 160 | 0.26 <br> 1.0 |
| Polypropylene (MF13) | 165–175 | 300 | {I.M. 200–300... <br> {Ext. 200–250... | 200 <br> 260 | 0.93 <br> 0.44 |
| Poly(4-methyl butene-1) | 240 | 300 | {I.M. 270–300... <br> {Ext. ~275....... | 270 | 0.21 |
| Polyethylene terephthalate | 255 | [1] 300 | 270–295 (fibre spinning) | 270 | 0.34 |
| Polycarbonate | 220–230 | 320 | I.M. 275–320... | 300 | 1.0 |

[1] Very dependent on moisture content.

NOTE: Figures in the $T_g$ column refer to measurements made on polymers containing little or no additive. Commercial polymers may have lower $T_g$ due to the presence of additives.

To be co-deformable with the thermoplastic, the glass must have a parameter $T_g+C$ (where $T_g$=transformation temperature for glass as defined above and $C$ is a temperature interval dependent on the type of glass and processing conditions used) which lies in the processing temperature range of the chosen thermoplastics.

A guide to the value of $C$ is the difference between $T_g$ and the Littleton softening point of the glass, being the temperature at which the glass has a viscosity of $10^{7.6}$ poise, and is measured by method of test ASTM (338–57 1965).

The decomposition temperatures for the known organic thermoplastics are such that glasses in which the principal network former is silica are unsuitable. Preferred glasses are those in which the network former is phosphorus oxide and/or boric oxide for which $C$ is typically 50–60° C.

THE GLASSES

Preferred glasses for use in our invention are those containing phosphorus and/or boron oxides as network formers with or without minor amounts of other network forming oxides such as vanadium pentoxide, bismuth oxide and silica. The network is modified by the introduction of cations such as those of the alkali metals, alkaline earth metals, silver, cadmium, zinc and lead.

Certain elements, such as aluminum and boron and oxides such as silica, which can form refractory phosphates in certain composition ranges should not be present in a mainly phosphate glass to an extent greater than 5 mole percent because of the high transition temperature of the resulting glass: for the same reason the silica content of the glass should not exceed 0.5 mole percent.

Much preferred glasses are those based on lead oxide-phosphorus oxide and zinc oxide-phosphorus oxide systems and mixtures thereof.

Examples of lead-containing glass are those having a composition within the following ranges:

(a) at least 95 mole percent is PbO and $P_2O_5$, the PbO content being 20–80 mole percent
(b) at least 95 mole percent is PbO therefore $R_2O$, and $P_2O_5$ where R is one or more alkali metals, PbO being present in the range 5–60 mole percent, $R_2O$ being present in the range 5–35 mole percent and $P_2O_5$ being present to the extent of up to 85 mole percent, or
(c) at least 95 mole percent is PbO (5–30 mole percent), $R_2O$ (5–30 mole percent), $B_2O_3$ (5–20 mole percent) and $P_2O_5$ (15–85 mole percent) respectively, in each case the remaining 0–5% of the glass composition consists of miscellaneous additives, for example oxides of other metals e.g. the type R'O where R' is an alkaline earth metal. ZnO may replace part or all of the PbO.

Particular glasses having compositions within the ranges described above have transformation temperatures in the range 160 to 250° C., Young's moduli in the range 2 to $10 \times 10_6$ lb./sq.$^2$ and are only slightly affected by water at 100° C. In particular alkaline earth cations such as magnesium, calcium and barium improve the water resistance of lead phosphate glasses and barium raises the softening point least of these metals- the presence of more than one alkali metal, for example a mixture of lithium and potassium results in better water resistance for a particular softening point than a glass containing only one alkali metal such as sodium.

The glasses may be prepared by conventional glass forming techniques, for example by heating together phosphoric oxide, phosphoric acid or ammonium or alkali metal phosphates with the appropriate metal oxides or carbonates. Equivalent boron compounds may replace or be used in addition to the phosphates. Ammonium phosphate or dihydrogen phosphate are convenient sources of phosphorus oxide. As phosphate glasses are acidic care must be taken in the selection of a material for containing the melt during preparation of the glass. Alumina is attacked by phosphate glass. A preferred material is clay bonded graphite.

After melting together the components it is desirable to refine the glass by heating to 300–800° C. for a period from 1 to 24 hours. This refining time has an effect on the transformation temperature and hence on the softening point of some glasses, especially those based on lead phosphate.

Typically, a lead phosphate glass ($P_2O_5$, 70.6 mole percent; PbO, 20.6 mole percent; $K_2O$, 2.5 mole percent; $Li_2O$, 5.0 mole percent; BaO, 2.5 mole percent) exhibits a transformation temperature rising from 142° C. (after 1 hour at 700° C.) up to 170° C. (after 16 hours). This is believed to be due to a reduction in hydroxyl content by loss of water with increased refining time. It is believed that the hydroxyl content (in terms of weight percent water) falls from 4% when the transformation temperature is 142° C. down to less than 1% when the transformation temperature is 170° C. This loss of water results in modification of other properties as shown in the following table:

| | 1 hour | 16 hours |
|---|---|---|
| Refining time of above mentioned glass at 700° C | | |
| Viscosity at 290° C. poise | $2.5 \times 10^4$ | $50 \times 10^4$ |
| Rate of solution in water at 100° C., percent per minute | 5.0 | 1.7 |
| Young's modulus ($\times 10^6$ p.s.i.) | 2.2 | 2.4 |
| Vickers pyramid hardness number (ASTM-E92/67) | 160 | 215 |

THE COMPOSITES AND TECHNIQUES FOR THEIR FABRICATION

The glass may be incorporated into the composite by a variety of techniques. Some of these techniques combine the introduction of the glass into the polymer with the shaping of an article from the composite. The ratio of polymer to glass may be 0.1 to 99.9 to 99.9 to 0.1 on a volume basis. Thus either glass, polymer or both may form a continuous phase.

A wide variety of polymers may be used in the composites of our invention. Not all polymers are co-deformable with all glasses. For example polyethylene has too low a melt-viscosity to be used in certain composite forming processes with glasses having a transformation temperature in the upper part of the range. However, even polyethylene can be formed into composites using some of the lower softening point glasses described, and if conventional composite forming techniques are used, in which preformed glass fibre is incorporated into the polymer, any of the glasses can be employed. Preferred polymers for use in the invention are high density polyethylene, polypropylene, poly-4-methylpentene-1, polyethylene terephthalate, polysulphones, polycarbonates, polytetrafluoroethylene, poly(vinyl chloride), and polystyrene.

However, in contact with many glasses which are suitable for use in the present invention, certain acid sensitive polymers may be degraded. The degree of degradation is dependent on choice of polymer, glass composition, processing temperature and on the presence of chain extenders in the polymer. Whether the degree of degradation is acceptable or not is best determined by trial on a small scale. Polyamides are generally quite seriously degraded and may not be suitable for many applications of the invention. Polyesters are somewhat affected, but less seriously so.

While the invention is principally concerned with composites of thermoplastic resins, certain thermosetting resins may be used if obtainable in the form of heat-softenable precursors. Such materials may be incorporated in composites and the re-shaping and final heat curing stages may be completed in a single operation.

In a first method of forming a composite according to the invention, a selected glass is spun into fibres or formed into flakes by known methods, then introduced into a polymeric matrix. (Glass flakes are particles having two dimensions considerably, say, 10 times, greater than the third dimension.) For thermoset resins, it is usual to lay up fibre in the form of mats or staple fibre and to impregnate this with polymers precursors, followed by curing to the final form. During the curing stage, advantage can be taken of the low softening point of the glass by carrying out a further shaping step before the polymer is too rigid to permit shaping, this further shaping step being taken above the transformation temperature of the glass. For thermoplastic polymers it is more usual to blend the fibres into the polymer on a mill using rolls rotating at different speeds or in an extruder. The product composite can be chipped and used in subsequent shaping operations in a conventional way. Provided that the glass and polymer are selected so that they are thermally co-deformable, operations such as injection moulding or extrusion may be carried out with less damage to the fibre than when using conventional non-deformable glass fibre.

In a second method of forming a composite, the initial stage of spinning the glass into fibre is avoided. A mixture of the glass and thermoplastic polymer (including precursors of a thermoset resin which can be heated and still can be deformed above the temperature at which the glass is deformable) are introduced into a shaping apparatus in which combining or mixing of the components occurs, e.g. an extruder, mill or combined extruder and injection moulding machine. The mixture may be in the form of separated beads, chips or other particles of the glass and polymer (or precursor thereof) or the mixture may have been preformed by an earlier mixing stage, e.g. using a mill or extruder. On shaping the composite into articles, both components of the composite are formed into the article simultaneously. Appropriate selection of the polymeric material, the glass and the shaping method causes fibre formation in the glass during processing, when the components of the composite are caused to flow under shaping conditions. Thus, operation according to this aspect of the invention allows the introduction of glass fibre reinforcement into articles by cheaper techniques than are normally used for the production of glass fibre reinforced plastics articles. For the production of glass fibres within the composite, it is desirable that the processing temperature, thermoplastic polymer and glass are selected such that under the processing conditions the viscosity of the glass is from 0.1 to 1000 times the viscosity of the polymer. These viscosities are measured at the processing temperature but separately from the shaping process at a shear rate of 10 sec.$^{-1}$. Typically, the concentration of glass in the polymer is 5 to 66% by volume. For the purposes of further illustration some typical polymers and suitable temperatures for processing with certain glasses described in detail in the examples, are given in Table 3 below.

| Glass No.[1] | Glasses having a transformation temperature (° C.), in the range | Temperature ° C. at which viscosity is $10^5$ poise | Examples of thermoplastics with which coprocessing is possible |
|---|---|---|---|
| 4 | 140 | 260 | H.D. polyethylene. |
| | 140 | 260 | Polypropylene. |
| | 140 | 260 | Polystyrene. |
| | 170 | 312 | Polymethyl methacrylate. |
| | 185 | 307 | Polypropylene. |
| 3 | 185 | 185 | Poly-4-methyl-pentene-1. |
| | 185 | 185 | Polyethylene terephthalate. |
| | 200 | 330 | Polycarbonate. |
| 1 | 200 | 370 | Polysulphone. |
| | 200 | 370 | Polytetrafluoroethylene. |

[1] See Examples for composition.

In a third method of forming a composite, particles of fibre of the selected glass may be impregnated with a solution of a polymer in a volatile solvent. After impregnation, the solvent is removed and the resulting composite can be consolidated by the application of heat and/or pressure. After cooling the composite may be re-shaped by heating to a suitable temperature.

In a fourth method of forming a composite, a glass fibre reinforced polymer fibre is produced by spinning a composite containing a fibre forming polymer matrix and glass of the type described generally above having a viscosity of the spinning temperature of 1 to 100 times that of the polymer. The composite from which the fibre is spun is conveniently a pre-prepared composite of the polymer, containing the glass, and prepared by milling or co-extruding the two components. The preferred polymer is polyethylene terephthalate and for use with this polymer, a glass having a transition temperature of from 130 to 190° C. and a viscosity in the range 3000 to 5000 poise at the spinning temperature which is usually about 285 to 295° C.

For polypropylene, a glass having a transition temperature in the range 100 to 190° C. is preferred, a viscosity in the range $10^4$ to $10^5$ poise and a spinning temperature of 310 to 315° C. The fibres so produced may be drawn to increase tensile strength by drawing at a temperature at which both glass and polymer are deformable without fracture.

In a fifth method of forming composities, rods or of glass fibre are formed from the melt and subsequently coated with polymer. Two or more rods or strands of coated fibre may be combined to form rods, tubes or bars. It is not essential that particularly thin glass fibres are used, because the composite may subsequently be heat softened consolidated and drawn as a whole, both the glass and matrix being co-extended in one direction. It is thus possible to prepare very thick section composites by aligning rods or bars of polymer matrix material and glass and drawing the whole in a heat softened state through die or between rollers to reduce the diameter by a large factor say, up to 1000 so that the glass in the finished composite is of a conventional glass fibre diameter, say 0.1 to 100 microns. Similarly, rods or strands of polymer may be coated with glass and combined in the same way.

In a sixth method of forming composites the glass is formed into sheet or flakes and applied to polymer sheet or flake to form a linear structure. Multiple layers may be built up and the whole consolidated by heat and optional pressure. The resultant composite may be compressed, e.g. by rolling to reduce the thickness and multiple layers of the laminate so formed may be combined e.g. by folding and re-rolled to produce even thinner laminae. A sheet material as prepared may be vacuum formed, preferably in two stages.

A seventh method is suitable for the fabrication of composites containing polytetrafluoroethylene and other polymers available in a dispersed form such as an emulsion. Powdered glass is mixed with powdered polymer or a liquid suspension of the polymer which is then coagulated and consolidated. The product is a powder suitable for moulding, and sintering.

APPLICATIONS

Composites according to our invention have a wide variety of uses. The glass may serve to reinforce the polymer, or the polymer may serve to reduce the brittleness of the glass. High glass contents are possible while retaining processability. Polytetraflurethylene composites with glass may be used as bearing materials. Small particles may be incorporated in fibres, film or sheet to modify wear and abrasion properties.

Glass fibre of the prescribed glasses give rise to strong, stiff materials which are thermally deformable. With high glass contents, flammability may be reduced.

Laminated films or foils containing flake or fibre of glass may be used as a wrapping or packing material. Tapes may be formed for binding purposes.

Fibre filled fibres in which either matrix or filler is glass have attractive appearance as well as increased strength or reduced brittleness. The glass or the fibre may be pigmented or coloured by known means.

Stiff hollow articles may be formed by blow moulding suitable composites.

The invention is illustrated by the following examples.

EXAMPLES (A) Preparation of glasses

A series of glasses were prepared by the following procedures for use in the preparation of composites.

Glass 1.—A low softening point glass was made by heating at 400° C. for 4 hours in a clay bonded graphite crucible an intimated mixture of 207.09 parts by weight of ammonium dihydrogen phosphate
100.44 parts by weight of litharge
17.80 parts by weight of potassium carbonate
2.4 parts by weight of sodium carbonate
0.75 parts by weight of magnesium oxide
1.05 parts by weight of calcium oxide to give a clear viscous melt. This melt was then further heated at 700° C. for 1 hour and poured into a mould to give a glass with the nominal composition

| | $P_2O_5$ | PbO | $K_2O$ | MgO | CaO | $Na_2O$ |
|---|---|---|---|---|---|---|
| Mole percent | 58.6 | 29.28 | 8.3 | 1.22 | 1.22 | 1.46 |
| Weight percent | 52.5 | 41.2 | 4.99 | 0.31 | 0.43 | 0.57 | and the following properties:

transformation temperature: 202° C.
soften point: 250° C.
Young's modulus: $4.5 \times 10^6$ lb./in.$^2$
density: 3.27 g./cm.$^3$
rate of dissolution in water at 100° C.: 0.2% per minute
melt viscosity: $10^6$ poise at 310° C.

Glass 2.—A low softening point glass was made by heating at 400° C. for 4 hours an intimate mixture of 207.09 parts by weight of ammonium dihydrogen phosphate
83.7 parts by weight of litharge
20.7 part by weight of potassium carbonate
2.88 parts by weight of BaO
0.75 parts by weight of MgO
2.43 parts by weight of CdO
3.42 parts by weight of $V_2O_5$ to give a clear viscous melt. This melt was then further heated at 700° C. for 1 hour and poured into a mould to give a glass with the nominal composition

| | $P_2O_5$ | PbO | $K_2O$ | BaO | MgO | CdO | $V_2O_5$ |
|---|---|---|---|---|---|---|---|
| Mole percent | 60 | 25 | 10 | 1.25 | 1.25 | 1.25 | 1.25 |
| Weight percent | 54.4 | 35.6 | 6.01 | 1.23 | 0.32 | 1.03 | 1.45 | and the following properties:

transformation temperature: 205° C.
soften point: 255° C.
Young's modulus: $5 \times 10^6$ lb./in.$^2$
density: 3.4 g./cm.$^3$
rate of dissolution in water at 100° C.: <0.02% per minute
melt viscosity: $10^6$ poise at 310° C.

Glass 3.—A low softening point glass was made by heating at 400° C. for 4 hours an intimate mixture of 207.09 parts by weight of ammonium dihydrogen phosphate
92.1 parts by weight of litharge
20.7 parts by weight of potassium carbonate
5.79 parts by weight of barium oxide to give a clear viscous melt. This melt was then further heated at 700° C. for 1 hour and poured into a mould to give a glass with the nominal composition

| | $P_2O_5$ | PbO | $K_2O$ | BaO |
|---|---|---|---|---|
| Mole percent | 60 | 27.5 | 10 | 2.5 |
| Weight percent | 53.3 | 38.33 | 5.88 | 2.39 | and the following properties:

transformation temperature: 184° C.
softening point: 235° C.
Young's modulus: $3.4 \times 10^6$ lb./in.$^2$
density: 3.4 g./cm.$^3$
rate of dissolution in water at 100° C.: 0.9% per minute
melt viscosity: $10^6$ poise at 255° C.

Glass 4.—A low softening point glass was made by heating at 525° C. for 6¾ hours an intimate mixture of 2415 parts by weight of ammonium dihydrogen phosphate
670 parts by weight of litharge 51.9 parts by weight of potassium carbonate
55.5 parts by weight of lithium carbonate
57.6 parts by weight of barium oxide to give a clear, viscous melt which was then further heated at 700° C. for periods from ½ hour to 16 hours. The resulting glasses, all of which had the nominal composition

|  | $P_2O_5$ | PbO | $K_2O$ | $Li_2O$ | BaO |
|---|---|---|---|---|---|
| Mole percent | 68.3 | 19.5 | 4.9 | 4.9 | 2.4 |
| Weight percent | 64.5 | 29.0 | 3.05 | 0.97 | 2.48 | had the following transformation temperatures, increasing with the reduction in hydroxyl content according to the time of refining:

| Glass No. | 4A | 4B | 4C | 4D | 4E | 4F |
|---|---|---|---|---|---|---|
| Refining time, hours | 0.5 | 1.0 | 2 | 4 | 8 | 16 |
| Transformation temperature, °C | 137 | 141 | 146 | 153 | 166 | 171 |

After 1 hour's refining time the glass had the following properties melt viscosity: $10^5$ poise at 260° C.
density: 3 g./cm.$^3$
rate of dissolution in water at 100° C.: 5% per minute.

Glasses 5–11.—A further series of glasses were prepared from appropriate starting materials according to the above procedures. The composition of each glass and transformation temperaure $T_g$ is recorded in the table below.

| Glass No. | Composition (mole percent) | | | | | | | | | | | $T_g$ °C. |
|---|---|---|---|---|---|---|---|---|---|---|---|---|
| | $P_2O_5$ | PbO | $K_2O$ | $Na_2O$ | $B_2O_3$ | ZnO | $Li_2O$ | BaO | CaO | MgO | CdO | |
| 5 | 66.1 | 19 | 4.8 | | | | 4.8 | 2.4 | | | 2.4 | 122 |
| 6 | 80 | | 15 | | 5 | | | | | | | 169 |
| 7 | 65.8 | 20 | 8.5 | 1.5 | | | | | 1.2 | 3.0 | | 173 |
| 8 | 60 | 5 | 10 | | | 25 | | | | | | 205 |
| 9 | 60 | 35 | 5 | | | | | | | | | 216 |
| 10 | 60 | 10 | 10 | | | | | | | | 20 | 301 |
| 11 | 50 | 50 | | | | | | | | | | |

(B) Preparation of Composite by Extrusion

Example 1.—Polysulfone (Union Carbide) and glass 2

(i) A kilogram of molten glass 2 was removed from the preparative furnace (temperature ~700° C.) and cast into a thin slab by pouring onto a sainless steel sheet and allowed to cool to room temperature. The slab was broken into suitably sized fragments and fed to a jaw crusher. The crushed product was separated into seven fractions by passage through a nest of six sieves (Test sieves to BS 410 of 1962) consisting of the following BSS mesh sizes: 8, 10, 12, 14, 22. The coarsest particles i.e. those retained by mesh No. 8, were reground and resieved, the finest particles passing mesh 22 were returned to the furnace for remelting. In the following examples the glass particle size distribution is characterized for each fraction by two numbers, the first designating the mesh size through which the particles passed and the second the size number of the mesh on which they were retained. The four fractions and corresponding particle size range are tabulated below

| Fraction | Particle size range diameter, inch | |
|---|---|---|
| | Maximum | Minimum |
| –10 mesh | 0.0787 | 0.0661 |
| 0–12 mesh | 0.0661 | 0.0551 |
| 2–14 mesh | 0.0551 | 0.0472 |
| 4–16 mesh | 0.0472 | 0.0394 |
| 6–22 mesh | 0.0394 | 0.0280 |

A mixture consisting of 300 g. of the 8–10 mesh fraction of glass 2 and 700 g. of Bakelite Polysulfone granules (Grade P1700—Union Carbide Corp. N.Y.) was prepared by gradually adding the glass to the polymer granules in a slowly revolving horizontal drum. The mixture was fed to an extruder of the type conventionally used for the extrusion of organic thermoplastic materials (Type W.X. Manufactured by Iddon Bros. Leyland, Lancs.) having a 1.25 in. diameter electrically heated barrel equipped with a screw having a length:diameter ratio of 20:1 and of the type and geometry recommended for the extrusion of nylon. The barrel of the machine was also equipped with temperature recording and controlling devices equidistant from each other and these were set to give the following temperature profile along the barrel:

320° C. at the die–300° C.–265° C.–250° C.–175° C. at the inlet

Using a screw speed of approximately 20 r.p.m. the mixed granules were extruded through a cylindrical die of 0.125 in. diameter to yield a continuous rod of composite material about 0.145 in. diameter.

A 2 in. length of the extruded rod was carefully extracted with chloroform (a solvent for the organic polymer), the residue consisted of glass in the form of a bundle of fine fibres lying with their axes in the same direction at the long axis of the original composite specimen i.e. in the extrusion direction. Microscopic examination (in a scanning electron microscope) revealed that the fibres were of regular ellipsoidal cross-section and generally of 3 to 6µ in diameter and an average length/diameter ratio of $\gg 100:1$. The tensile modulus of the rod was $9.2 \times 10^5$ lb./in.$^2$ (634 GNm.$^{-2}$) compared to a value of $4.0 \times 10^5$ lb./in.$^2$ (276 GNm.$^{-2}$) on a similar rod of unmodified polysulfone tested in a similar manner.

(ii) The procedure was repeated using a mixture of polysulfone and glass 2 containing 25.0% by weight (10.7% by volume) of 10–12 mesh glass granules and substantially the same temperature profile in the extruder barrel. A high proportion of the glass was in fibrous form and the rod had a tensile modulus of $8.1 \times 10^5$ lb./in.$^{-2}$ (5.5 GNm.$^{-2}$).

(iii) In a further preparation a mixture of 48% by weight of 14–16 mesh glass granules with polysulfone was extruded under substantially similar conditions to those described above. The extruded rod had a tensile modulus of $1.5 \times 10^6$ lb./in.$^2$ (10.4 GNm.$^{-2}$).

(iv) Fibres of glass were also obtained when a mixture of 30% w./w. of combined sieve fractions 14–16 and 16–22 from glass 2 and polysulfone were extruded as above.

In the composite preparations described in this example the temperature profile in the extruder barrel was most commonly approximately that given above. However in replicate tests it was found that some variation of these conditions was possible. For example the die temperature may be varied from 300° C. to 320° and the entry temperature from 175° C. to 220° C. In general mixtures containing higher proportions of glass are advantageously extruded at the higher temperatures in these examples.

Example 2.—Polysulfone (Union Carbide) and glass 1

(i) A mixture consisting of 30% by weight of glass 1 granules of 14–16 mesh was prepared and extruded under the conditions of Example 1 using the following temperature profile in the extruder barrel:

315° C. (die)–290–270–260–240° C.

The extruded rod possessed a fibrous composite structure similar to the previous example.

(ii) In a further experiment under the same conditions but using a finely ground glass powder with a particle size averaging 250$\mu$ the composite rod contained few fibres and the bulk of the glass was observed under the microscope to be in the form of spheres with an average diameter of 1.25$\mu$.

Example 3.—Polypropylene and glass 3

(i) A mixture consisting of 30% w./w. of glass 3 granules of size 5–12 mesh and a commercial polypropylene ("Propathene" GWM22—ICI Limited) was prepared and extruded under essentially the same conditions as Example 1 but using a screw of the type recommended for the extrusion of polyethyl and the following temperature profile in the extruder barrel:

240° C. (die)–240–200–180–180° C. (entry)

Extraction of a 2 in. length of the extruded rod with hot xylene left a residue of glass fibres the majority having a very high length/diameter ratio (i.e. $\gg$100:1) aligned in the extrusion direction.

(ii) The above procedure was repeated using glass 3 granules of mesh size 7–12 at three different volume fractions of glass. In all cases the bulk of the glass in the extruded rod was in fibrous form. The compositions and tensile moduli of the products from these extractions are tabulated below together with the tensile modulus of extruded polypropylene alone for comparison.

| Glass content, percent | | Tensile modulus | |
| --- | --- | --- | --- |
| Weight | Volume | Lbs./cm.$^2$ 10$^5$ | GNm$^{-2}$ |
| Nil | Nil | 2.0 | 1.4 |
| 24 | 7.6 | 6.6 | 4.5 |
| 45 | 17.1 | 9.9 | 6.8 |
| 75 | 43.5 | 14.0 | 9.7 |

(iii) In a further series of four preparation mixtures of glass 3 and "Propathene" granules containing from 90% by weight (70% by volume) to 99% by weight 97.5% by volume) of glass of mesh size were extruded using the following temperature profile in the extruder barrel:

260° C. (die)–260–220–200–180° C. (entry)

Although the screw head pressures required were higher than those used for the previous examples smooth coherent but brittle rods were continuously extruded. Examination of a fractured surface of the rod in a scanning electron microscope revealed that the polypropylene was present in the form of fibres in a matrix of glass. Under the fracturing force the fibres were attenuated but not detached from the matrix. The rods from each experiment were granulated and used for injection moulding in Example 10 below.

Example 4.—Polypropylene and glass 4

(i) A mixture containing 33% by weight of glass 4B granules of size 14–52 mesh and "Propathene" GWM22 was extruded using the same apparatus as in Example 3 but with a screw of the type used for the extrusion of nylon and the following temperature profile:

235° C. (die)–225–210–200–185° C. (at entry)

Examination of the extruded rod showed that the major proportion of glass present was in fibrous form. A duplicate experiment using glass 3 of the same particle size and volume fraction required the following temperature profile for satisfactory extrusion:

270° C. (die)–260–245–235–220 (entry)

However only small fibres were produced in this composite together with a large proportion of non-fibrous particles.

(ii) 20 lbs. of glass 4B granules of mesh size 14–52 were mixed with 40 lbs. of "Propathene" GSE 108 (ICI Limited) and fed to a Peco Model 25 extruder equipped with a screw of the type recommended for the extrusion of polypropylene length/diameter ratio of 20:1. The composite material was extruded through a Reifenhauser sheet die of "fish tail" configuration using the temperature profile along the barrel given below and at a screw speed of 40 r.p.m.

| Zone: | Temp. ° C. |
| --- | --- |
| 1 (entry) | 195 |
| 2 | 210 |
| 3 | 220 |
| 4 | 210 |
| 5 | 195 |
| 6 (middle of die) | 220 |
| 7 (end of die) | 190 |
| 8 (end of die) | 190 |

The extrudate passed from the die to a three bowl polishing unit to yield a continuous sheet 0.125 in. thick and 21 in. wide. Examination of sections of the sheet revealed a laminated structure and that the glass was present as thin flakes of indeterminate area lying with their long axes in the extrusion and rolling planes of the sheet.

(iii) Polypropylene polymer powder of intrinsic viscosity 3.2 dl./g. was compressed at 140° C. under 80 p.s.i. pressure to form a solid rod 1" diameter and $\sim$3" long. This rod was bored out to form a cylindrical container with a wall and base thickness of ¼" and the container packed with dried finely powdered glass 4B. A rod spinner pack was fitted with a single hole spinneret, of hole diameter 0.020 inch, and a bridge plate forming a conical entry to the hole. The "composite" candle was charged to the barrel of the pack, and extruded, by means of a ram, at the rate of 1 gm./min. and at a temperature of 275° C., the extruded filament being wound up at 250 ft./min. This filament could be drawn to a draw ratio of 2.0 over a hot pin at 110° C. and plate at 170° C. A cross section of the spun filament showed the glass to be present as a continuous core, of rounded triangular cross-section, completely surrounded by polymer.

Example 5.—Polyethylene terephthalate and glass 3

(i) A mixture consisting of 50% by weight of glass 3 granules of 12–14 mesh and polyethylene terephthalate having a reduced specific viscosity of 0.94 (measured on a percent solution in o-chlorophenol at 25° C.) was extruded as in Example 1(i) using the following temperature profile:

275° C. (die)–240–220–220–215° C. (entry)

The polyethylene terephthalate was extracted with hot o-chlorophenol. Microscopic examination of the residue revealed that the glass was in fibrous form.

The procedure was repeated using 40% and 45% by weight of glass with the same result. The increase in tensile modulus (0.1% strain) of the extruded rods compared to polyethylene terephthalate alone are tabulated below:

| Glass content, percent | | Tensile modulus | |
| --- | --- | --- | --- |
| Weight | Volume | Lbs/cm.$^2$, 10$^5$ | GNm.$^{-2}$ |
| Nil | Nil | 4.1 | 2.8 |
| 45 | 25 | 12.8 | 8.8 |
| 40 | 22 | 11.7 | 8.1 |

Example 6.—Poly(4-methylpentene-1) and glass 3

(i) A mixture consisting of 30% by weight of glass 3 granules of size 14–30 mesh and granules of commercial poly(4-methylpentene-1), ("TPX" Grade RT14, ICI Limited) was extruded in the apparatus used in Example 1(i) but using a screw of the type recommended for the extrusion of polyethylene and the following temperature profile in the extruder:

290° C. (die)–270–250–240–230° C. (at entry)

The opaque extruded rod consisted of a composite of glass fibres in a matrix of partially crystalline polymer.

Example 7.—Polymethyl methacrylate and glass 7

A glass having the composition (in mole percent) of glass 7 was ground and sieved to give particles between 250 and 600 microns in diameter. It was mixed with polymethyl methacrylate resin in the form of 1.5 mm. granules in the proportions 25 parts by weight of glass to 50 parts of resin and the mixture was extruded from a Davenport capillary viscometer with a 1 cm. barrel and 3 mm. capillary, at temperatures from 200° C. to 240° C. The polymer was extracted from the extruded rod with chloroform and the residual glass examined.

At extrusion temperatures below 205° C., the glass was still in the form of granules at low sheet rates. At 205° C., the glass was in the form of short rods at a shear rate of 28 sec.$^{-1}$ and fibres were produced at a shear rate of 620 sec.$^{-1}$.

At temperatures of 220° C. and 240° C. the glass was in the form of fibres at all shear rates, the fibres being 2–10 microns in diameter and up to 2 cm. long.

Example 8.—Polystyrene and glass 7

Glass 7 was ground and sieved to give particles between 250 and 600 microns in diameter. It was then mixed with polystyrene resin B 1001 MW in the form of 100-micron spheres, to give a mixture containing 15 parts by weight of glass to 50 parts by weight of polymer. The mixture was extruded from a Davenport capillary viscometer with a 1 cm. barrel and a 3 mm. capillary using shear rates from 0.4 to 1800 sec.$^{-1}$, at a temperature of 240° C.

The polymer was extracted from the extruded rod with chloroform and the residual glass was found to be in the form of fibres of diameter 10–50 microns and lengths up to 2 cm.

(C) Preparation of Composites by Injection Moulding

Example 9.—Polysulfone and glass 1

The extruded rod produced in Example 2(i) was granulated and moulded into bars approximately 50 mm. x 9 mm. x 3 mm. using an Austin-Allen Automatic Moulding Machine Type 250P at a cylinder temperature of 310° C. and a mould temperature of 25° C. One of the bars was treated with chloroform to remove the organic matrix. The residue of glass consisted of a mass of fine randomly dispersed fibres. The flexural modulus of the composite bars was $7.0 \times 10^5$ lb./in.$^2$ compared to $3.2 \times 10^5$ lb./in.$^2$ for a polysulfone bar prepared under the same conditions.

Example 10.—Polypropylene and glass 3

Extruded rods produced in Example 3(iii) were granulated and injection moulded in an Austin-Allen Automatic Moulding machine to produce bars approximately 50 mm. x 9 mm. x 3 mm., the composition of the feedstock, moulding conditions and tensile modulus of the moulded bars are tabulated below.

| Glass content, percent by— | | Barrel temperature, ° C. | Mould temperature, ° C. | Tensile modulus, lb./cm.$^2$ |
|---|---|---|---|---|
| Weight | Volume | | | |
| 90 | 70 | 260 | 140 | $8.0 \times 10^5$ |
| 95 | 84 | 300 | 140 | $1.4 \times 10^6$ |
| 975 | 92 | 300 | 140 | $1.6 \times 10^6$ |

Example 11.—Poly(4-methylpentene-1) and glass 3

The extruded rod prepared in Example 6(i) was granulated and injection moulded as in Example 10 using a cylinder temperature of 280° C. and a mould at room temperature.

Example 12.—Polycarbonate and glass 3

(i) The Austin-Allen automatic moulding machine was modified by removing the nozzle valve (a machined metal insert at the end of the nozzle drilled with 4 x 2.25 mm. holes through which material flows into the mould) thus leaving a single cylindrical orifice 7.8 mm. in diameter. A mixture consisting of 33% by weight of glass 3 granules of 14–30 mesh size and a commercial polycarbonate ("Makrolon" 3000L, Bayer) in granular form was fed to the modified machine equipped with a mould for retangular bars 50 mm. x 9 mm. x 3 mm. entry to the mould being at one end of the rectangle. The moulded bars contained glass fibres similar to those obtained in the extrusion experiments described earlier, having length/diameter ratios of at least 50:1 and lying parallel to the long axis of the bar.

(ii) The above procedure was repeated with a mixture containing 50% by weight of glass. The bars which again contained oriented fibres of glass had flexural moduli (determined in accordance with ASTM D790) in the range 8.5 to $9 \times 10^5$ lb./in.$^2$.

(iii) In a further moulding test the mixture contained 64% by weight of the glass, moulding was achieved under the same conditions and the average flexural modulus was found to be $1.07 \times 10^6$ lb./in.$^2$.

(D) Thermal Forming of Laminated Composite Sheet

Example 13.—Poly(vinyl chloride) and glass 4B

A sheet of glass 4B 0.5 mm. thick, was prepared by pouring molten glass (temperature 380–400° C.) into the nip of a twin roll mill with the rolls rotating at the same speed and at a surface temperature of 160° C. A piece of the sheet 6" x 3" was cut from the length with a hot wire, sandwiched between two 1 mm. thick sheets of clear rigid poly(vinyl chloride) ("Darvic" ICI Limited) and the assembly then pressed together between two platens under a pressure of 30 lb./cm.$^2$ and at a temperature of 175°–180° C. On removal from the press the assembly was rapidly bent through 180° and returned to the press for a few seconds to compact it. After cooling the composite material was sectioned with a band saw and examined under the microscope. The glass was found to show no evidence of cracking.

Example 14.—Polymethacrylate and glass 4B

The above experiment was repeated with a transparent acrylic sheet ("Perspex" ICI Limited) using a platen temperature of 210° C. with essentially the same results.

(E) Preparation of Glass Fibre Reinforced Fibers

Example 15

A mixture of 90% by weight polypropylene polymer of intrinsic viscosity 3.2 dl./gm. and 10% glass 3 was extruded at 315° C. through a single spinneret hole of 0.020" diameter, and a filament wound up at 200 ft./min. The glass, which has an initial particle size $>300\mu$ was present in the fibre both as fibrils and globules, diameters being essentially below $5\mu$.

Example 16

10 gm. of glass 3 was ground to pass through a 100 mesh sieve and mixed with 90 gm. of powdered polyethylene terephthalate of intrinsic viscosity 0.88 dl./gm. The mixture was vacuum dried for 12 hours at 140° C. and then extruded through a spinneret containing 3 holes of 0.015" diameter at a temperature of 295° C. and throughput rate of 2 gm./min. The spinneret was preceded by a 100 mesh filtration gauze. Filaments were wound up 1000 ft./min. using a heated shroud around the threadline (320° C. temperature). Microscope examination of the filaments showed the glass to be present essentially as fibrils of diameter 1–2μ and $L/d > 200$.

Example 17

100 gm. of polyethylene terephthalate of intrinsic viscosity 0.88 dl./g. and 10 gm. of glass 4B were mixed and dried at 120° C. for 12 hours under vacuum, the glass having been previously dried in bulk and ground to pass through a 100 mesh sieve. The mixture was extruded through a single hole spinneret, of diameter 0.020", at 293° C. and throughput 1.5 gm./min. and wound up at 1500 ft./min. Filaments exhibited a fibril structure as in Example 2.

Example 18

A polysulphone polymer containing 30% by weight of glass 1 was prepared as in Example 2(i). This material containing fibrils of glass of 1–2μ diameter and $l/d > 100$ was dried for 8 hours at 140° C. and extruded through a single hole of 0.015" diameter at 380° C. A filament was wound up at 100 ft./min., and shown to contain fibrils of idameter similar to the feedstock but of reduced length ($L/d < 30$).

Example 19

A polyester polymer containing 30% by weight of glass 3 was prepared as in Example 5(i) the glass being essentially in the form of fibrils of diameter 2–5μ and $L/d > 1000$. The dried polymer was extruded through a single hole of 0.015" diameter at 287° C. and wound up at 100 ft./min. The filament contained glass fibrils of 1–5μ diameter and $L/d < 100$.

(F) Miscellaneous Composites

Example 20

Glass 4B was heated in a platinum crucible to 300° C. and 8-micron diameter fibre was drawn continuously from a 1 mm. hole in the bottom of the crucible at a speed of 44 ft. per second. A quantity of the fibre so obtained was chopped to an average length of ¼ inch and mixed with granules of polyethylene having a melt viscosity of 5000 poises at 170° C. The resulting mixture contained 50% by weight of glass. This was pressed between platens heated to 120° C. to give a flat sheet containing randomly-dispersed glass fibres. This material was opaque and noticeably more rigid than similar sheet made from the polyethylene granules alone.

Example 21

The procedure of Example 20 was repeated using polypropylene and glass 4B. On heating to 180° C. the composite sheet could be sharply folded without fracture of the glass reinforcement.

Example 22

A mixture of equal parts of glass 9 and polycarbonate resin, both in the form of small granules, was heated in a mould under pressure of 5 tons per square inch at 300° C. The resulting moulding was sectioned and microscopical examination showed that both the glass and the polycarbonate resin had flowed so as to form an intimately mixed composite which completely filled the mould and was free from voids. This pressing could subsequently be re-shaped to a new form by heating in an oven to 270° C. and bending over a former.

Example 23

A mixture of approximately equal parts of glass 11 and a polycarbonate resin was heated to 300° C. By inserting a heated rod into the melt until it contacted the lower glass layer and pulling upwards a composite fibre was drawn which consisted of glass coated with polycarbonate. At 270° C., this fibre could be bent sharply over an edge without fracturing the glass core.

Example 24

20 parts by weight of glass 5 was coarsely powdered and mixed with 80 parts by weight of polyethylene ("Rigidex 2000") of melt-flow index 0.2 and the mixture was extruded at a die temperature of 190° C. to give a composite rod, ⅛" in diameter. Microscopic examination of sections showed the glass to be in the form of fibres lying parallel to the axis of the rod.

Example 25

15 parts by weight of coarsely powdered glass 6 was mixed with 75 parts by weight of polypropylene ("Propathene GSE 108") and the mixture fed to a Peco Model 25 extruder equipped with a fishtail die for sheet production. The die temperature was 220° C. and the extrudate was a sheet ⅛" thick and 21" wide.

Microscopical examination of sections of the sheet showed that the glass was partly in the form of fibres and partly in the form of flakes, the fibres and flakes lying mainly in the plane of the sheet.

Example 26

A quantity of glass 4 fibre prepared as in Example 20 was chopped to an average length of 0.25 in. and formed into a loose mat on a perforated metal tray. The mat was then thoroughly impregnated with a 10% solution of Polysulfone in methylene chloride (Union Carbide) and allowed to dry. The impregnated mat was consolidated by compression moulding at 280° C. and 100 lb./in.² for 10 minutes. After cooling a portion of the sheet was treated with successive portions of hot chloroform to remove the organic polymer. Microscopic examination of the fibrous glass residue revealed that many fibres had fused together at intersections and the fibres could not be separated without rupture.

Example 27.—Polysulfone (Union Carbide) and glass 8

A mixture consisting of 35% by weight of glass 8 particles passing a 14 mesh sieve with Polysulfone (Union Carbide) granules was extruded in the manner described in Example 1 using the following temperature profile in the extruder barrel:

295° C. (die)–280–270–255–240 (entry)

Microscopic examination of the extrudate revealed the presence of glass in fibrous form.

Example 28.—Vacuum forming polypropylene/glass 4B laminated sheet

A sheet of glass 4B ($T_g \sim 140°$ C.) 80 cm. square and 0.5 mm. prepared as described in Example 13 was sandwiched between two sheets of polypropylene 1.5 mm. thick. The assembly was heated to 180° C. and then compacted under a pressure of approximately 100 lbs./in.². The sandwich was transferred to a vacuum moulding apparatus consisting of a frame by means of which the ends of the sheet were gripped, an infra-red heater above the frame and a male mould beneath the frame and so constructed that a vacuum can be applied to the underneath surface of the sheet thereby drawing the sheet (when sufficiently softened by heat) over the mould. The sheet was heated to a temperature of 190°–200° C. and the vacuum applied. The laminated sheet was drawn over the mould and after cooling slowly the formed laminated sheet was removed.

Example 29.—Polytetrafluoroethylene with glasses 10 and 1

A mixture consisting of 33.3% by weight of powdered glass 10 passing a 52 mesh sieve and "Fluon" G163 powder (ICI Limited) was intimately mixed. A quantity of the mixture was transferred to a positive pressure mould and a disc 40 mm. in diameter and 5 mm. thick formed by applying a pressure of 14 tons/in.² for 15 minutes at a temperature of 380° C. After cooling the resistance of the disc to compression was measured by placing it between two parallel plates and applying a load across them of 2460 lb./in.$^2$ for 30 minutes. The thickness of the disc was found to have been diminished by 3.1% compared to 7.0% for an unmodified "Fluon" disc prepared and tested in the same way. The experiment was repeated using glass 1. In the compression test this composite disc was reduced in thickness by 2.5%. In a further experiment with a "Fluon"/glass 1 mixture in which moulding was carried out at 250° C. (i.e. below the "gel temperature" of the organic polymer but above the $T_g$ of the glass) a well-integrated disc was formed which gave a thickness reduction of 6.0% in the compression test—a control specimen containing only "Fluon" also moulded at 250° C., fractured, as expected, when the compressive load was applied.

What we claim is:

1. A composite material containing an organic thermoplastic polymer and an inorganic oxide glass having a transformation temperature in the range 100° C. to 400° C., and which softens between the softening temperature of the thermoplastic and the highest temperature at which the thermoplastic is chemically stable.

2. A composite material according to claim 1 in which said polymer constitutes a matrix in which is dispersed a discontinuous phase of said glass in the form of fibres or flakes.

3. A composite material according to claim 2 in which said glass has an elastic modulus at 20° C. of at least $2 \times 10^6$ p.s.i.

4. A composite material according to claim 2 in which said glass constitutes a matrix in which is dispersed a discontinuous phase of said polymer.

5. A composite material according to claim 1 in which the glass contains phosphorus oxide or boron oxide as the principal network former.

6. A composite material according to claim 5 in which the glass contains other network forming oxides selected from vanadium pentoxide, bismuth oxides and silica, not exceeding 5 mole percent in total and in which the silica content does not exceed 0.5 mole percent.

7. A composite material according to claim 6 in which the glass contains lead oxide, cadmium oxide or zinc oxide, or mixtures of two or more of these.

8. A composite material according to claim 7 in which the glass has a composition in the following ranges (a) at least 95 mole percent is PbO and $P_2O_5$, the PbO content being 20–80 mole percent (b) at least 95 mole percent is PbO, $R_2O$ and $P_2O_5$, where R is one or more alkali metals, PbO being present in the range 5–60 mole percent, $R_2O$ being present in the range 5–35 mole percent, and $P_2O_5$ being present to the extent of up to 85 mole percent, or (c) at least 95 mole percent is PbO (5–30 mole percent), $R_2O$ (5–30 mole percent), $B_2O_3$ (5–20 mole percent) and $P_2O_5$ (15–85 mole percent) respectively, in each case the remaining 0–5% of the glass composition consists of miscellaneous additives.

9. A composite material according to claim 8 in which from 0.5 to 5 mole percent in total of that part of the glass composition other than the miscellaneous additives is replaced by one or more alkaline earth metal oxides.

10. A process for the production of composites according to claim 1 in which fibres or flakes of glass having a transition temperature in the range 100° C. to 400° C. are produced in or introduced into a thermoplastic polymer matrix material, said glass softening between the softening temperature of the thermoplastic and the highest temperature at which the thermoplastic is chemically stable.

11. A process for producing shaped articles in which the composite material prepared according to claim 10 is subjected to a shaping operation at a temperature at which both polymer and glass are deformable without fracture.

12. A process for producing composites according to claim 1 in which glass and polymer are combined together at a temperature at which both polymer and glass are deformable without fracture to form a two phase system.

13. A process for the production of shaped articles of composites according to claim 1 in which glass and polymer are mixed together and shaped at a temperature at which both polymer and glass are deformable without fracture and shaped by a process in which the components of the composite are caused to flow, the glass, polymer and processing temperature being selected such that the viscosity of the glass (at the processing temperature but measured separately at a shear rate of 10 sec.$^{-1}$) is from 0.1 to 1000 times the viscosity of the polymer (also at the processing temperature but measured separately at a shear rate of 10 sec.$^{-1}$).

14. A process for the production of glass fibre reinforced polymer fibres in which a composite according to claim 1 is subjected to a melt spinning operation, the viscosity of the glass (at the processing temperature but measured separately at a shear rate of 10 sec.$^{-1}$) being 1 to 10 times the viscosity of the polymer at the spinning temperature.

15. A process for the production of fibres according to claim 14 in which a mixture of polyethylene terephthalate and a glass having a transition temperature from 130 to 190° C. and a viscosity (at the processing temperature but measured separately at a shear rate of 10 sec.$^{-1}$) in the range 3000 to 50,000 poises at the spinning temperature is spun into fibres at a temperature in the range 285 to 295° C.

16. A process for the production of fibers according to claim 14 in which a mixture of polypropylene and glass having a transition temperature from 100 to 190° C. and a viscosity (at the processing temperature but measured separately at a shear rate of 10 sec.$^{-1}$) in the range $10^4$ to $10^5$ poise at the spinning temperature is spun into fibres at a temperature in the range 310 to 315° C.

17. A process for the production of a composite according to claim 1 in which rods or strands of the glass are coated with polymer or rods or strands of polymer are coated with the glass, two or more coated rods or strands are combined, heat softenend and consolidated.

18. A process according to claim 17 for the production of a composite fibre in which the diameter of the consolidated product is reduced in a heat softened state to a diameter of 0.1 to 100 microns.

19. A process for the production of composites laminar structures of composite according to claim 1 in which the glass in sheet or flake form is applied to polymer sheet or flake and the resultant laminar composite consolidated.

20. A process for the production of composites according to claim 1 in which a mixture of polymer and the glass both in powdered form are consolidated by means of heat to form a composite.

References Cited

UNITED STATES PATENTS

| | | | |
|---|---|---|---|
| 3,578,630 | 4/1971 | Rieke et al. | 260—41 |
| 3,531,432 | 9/1970 | Graver | 260—41 |
| 3,420,683 | 1/1969 | Okeda | 106—47 |
| 3,480,566 | 11/1969 | Hoffman | 252—514 |
| 3,485,646 | 12/1969 | Junge | 106—47 |
| 3,576,782 | 9/1971 | Molbert | 260—41 |

MORRIS LIEBMAN, Primary Examiner

R. ZAITLEN, Assistant Examiner

U.S. Cl. X.R.

260—37 R, 37 N, 40 R, 41 A